(12) United States Patent
Scheifele

(10) Patent No.: US 11,518,196 B2
(45) Date of Patent: Dec. 6, 2022

(54) TIRE HAVING EXPOSED THREE DIMENSIONAL SIPE PATTERNS

(71) Applicant: Bridgestone Americas Tire Operations, LLC, Nashville, TN (US)

(72) Inventor: Kevin E. Scheifele, Atwater, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 276 days.

(21) Appl. No.: 16/060,145

(22) PCT Filed: Dec. 15, 2016

(86) PCT No.: PCT/US2016/066785
§ 371 (c)(1),
(2) Date: Jun. 7, 2018

(87) PCT Pub. No.: WO2017/112504
PCT Pub. Date: Jun. 29, 2017

(65) Prior Publication Data
US 2018/0354312 A1    Dec. 13, 2018

Related U.S. Application Data

(60) Provisional application No. 62/270,778, filed on Dec. 22, 2015.

(51) Int. Cl.
*B60C 11/12* (2006.01)
*B60C 11/03* (2006.01)
(Continued)

(52) U.S. Cl.
CPC ...... *B60C 11/1218* (2013.01); *B60C 11/0306* (2013.01); *B60C 11/04* (2013.01);
(Continued)

(58) Field of Classification Search
CPC ............. B60C 11/1218; B60C 2011/1213
See application file for complete search history.

(56) References Cited

U.S. PATENT DOCUMENTS 6,467,517 B1 * 10/2002 Radulescu .......... B60C 11/0309
152/209.18
2004/0069389 A1 * 4/2004 Ratliff, Jr. ........... B60C 11/1384
152/209.15
(Continued)

FOREIGN PATENT DOCUMENTS

EP    1170153    1/2002
EP    1616721    1/2006
(Continued)

OTHER PUBLICATIONS

International Search Report and Written Opinion; Corresponding PCT Application Serial No. PCT/US2016/066785; dated Apr. 3, 2017.
(Continued)

*Primary Examiner* — Timothy Kennedy
*Assistant Examiner* — Farah Taufiq
(74) *Attorney, Agent, or Firm* — Shaun J. Fox; Bryan J. Jaketic

(57) ABSTRACT

The present disclosure is directed to tire tread blocks each having a sipe and cut-out portions that reveal a three dimensional sipe pattern on interior walls of the tread block. More particularly, the sipe defines the interior walls of the tread block and divides the tread block into first and second portions. The sipe further defines the sipe pattern on the interior walls of the tread block, on the first and second portions. The cut-out portions are located on the first and second portions, and expose the sipe patterns on the second and first portions, respectively.

16 Claims, 7 Drawing Sheets

(51) Int. Cl.
  B60C 11/04  (2006.01)
  B60C 11/13  (2006.01)
(52) U.S. Cl.
  CPC ...... B60C 11/1281 (2013.01); B60C 11/1392 (2013.01); *B60C 2011/0341* (2013.01); *B60C 2011/1213* (2013.01)

(56)  References Cited

U.S. PATENT DOCUMENTS

2007/0102085 A1    5/2007  Ohashi
  2009/0283189 A1*  11/2009  Mun .................. B60C 11/1218
                                                      152/209.18
  2011/0265926 A1   11/2011  De Staercke
  2012/0318420 A1*  12/2012  Sawai .................. B60C 11/042
                                                      152/209.15
  2013/0213542 A1*   8/2013  Warfford ............. B60C 11/0327
                                                      152/209.18
  2015/0053320 A1    2/2015  Mathonet et al.
  2016/0082780 A1*   3/2016  Nagahara ............ B60C 11/1392
                                                      152/209.18

FOREIGN PATENT DOCUMENTS

EP       3025877          6/2016
  JP       08058313  A  *   3/1996
  JP       2001001722       1/2001
  JP       2005104194       4/2005
  JP       201524733        2/2015
  WO       2005123420      12/2005
  WO       2008065947       6/2008
  WO       2011062595       5/2011

OTHER PUBLICATIONS

European Search Report and Written Opinion; Corresponding European Application Serial No. 16879888; dated Jul. 12, 2019.

* cited by examiner

TIRE HAVING EXPOSED THREE DIMENSIONAL SIPE PATTERNS

FIELD OF INVENTION

The present disclosure is directed to a structure that reveals a three dimensional sipe, which is located inside tread blocks. More particularly, this disclosure is directed to a partially exposed three dimensional sipe that is exposed by a cut out on a face of a tread block.

BACKGROUND

Some circumferential treads of passenger tires have ribs or blocks with sipes, or small cuts. Such sipes may be linear, or they may have a three dimensional shape. Existing designs for three dimensional sipe patterns do not expose the pattern within tread blocks. Such sipe patterns are buried inside tread blocks and are therefore not visible to the consumer and are not exposed to elements on a road, such as snow. These designs do not efficiently hold snow within the three dimensional sipe pattern, and are not observable by a user.

SUMMARY

In one embodiment, a tire has a bead portion, a carcass ply terminating in the bead portion, and a tread located above the carcass ply. The tread includes a rib extending circumferentially around the tire, and is formed by a plurality of blocks. The tread further includes lateral grooves that define lateral walls of the blocks. Each block includes a sipe that defines first and second portions of the block and interior walls of the block. The interior walls of the block have zig-zag patterns that interlock with each other. The second portion of the blocks further includes cut-out portions that reveal the zig-zag patterns of the first portions.

In another embodiment, a tire includes a tread that extends in a circumferential direction around an outer surface of the tire. The tread further includes a plurality of blocks protruding outwardly from the tread, and each block includes a sipe that divides the block into first and second portions. The first and second portions each have first and second walls, and the second walls of the first portions each have a pattern extending in a radial direction. Further, the second portions have cut-out portions that expose the patterns of each first portion.

In another embodiment, a tire tread includes a plurality of circumferential grooves defined by a plurality of blocks. The tread further includes a plurality of lateral grooves extending between the circumferential grooves. Each block has a first and a second portion, with the first and second portions having first and second walls. The second walls of the first portions include first patterns and the first walls of the second portions include second patterns corresponding to the first patterns. Finally, the second portion of each block includes a cut-out portion exposing the first patterns on each respective first portion.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
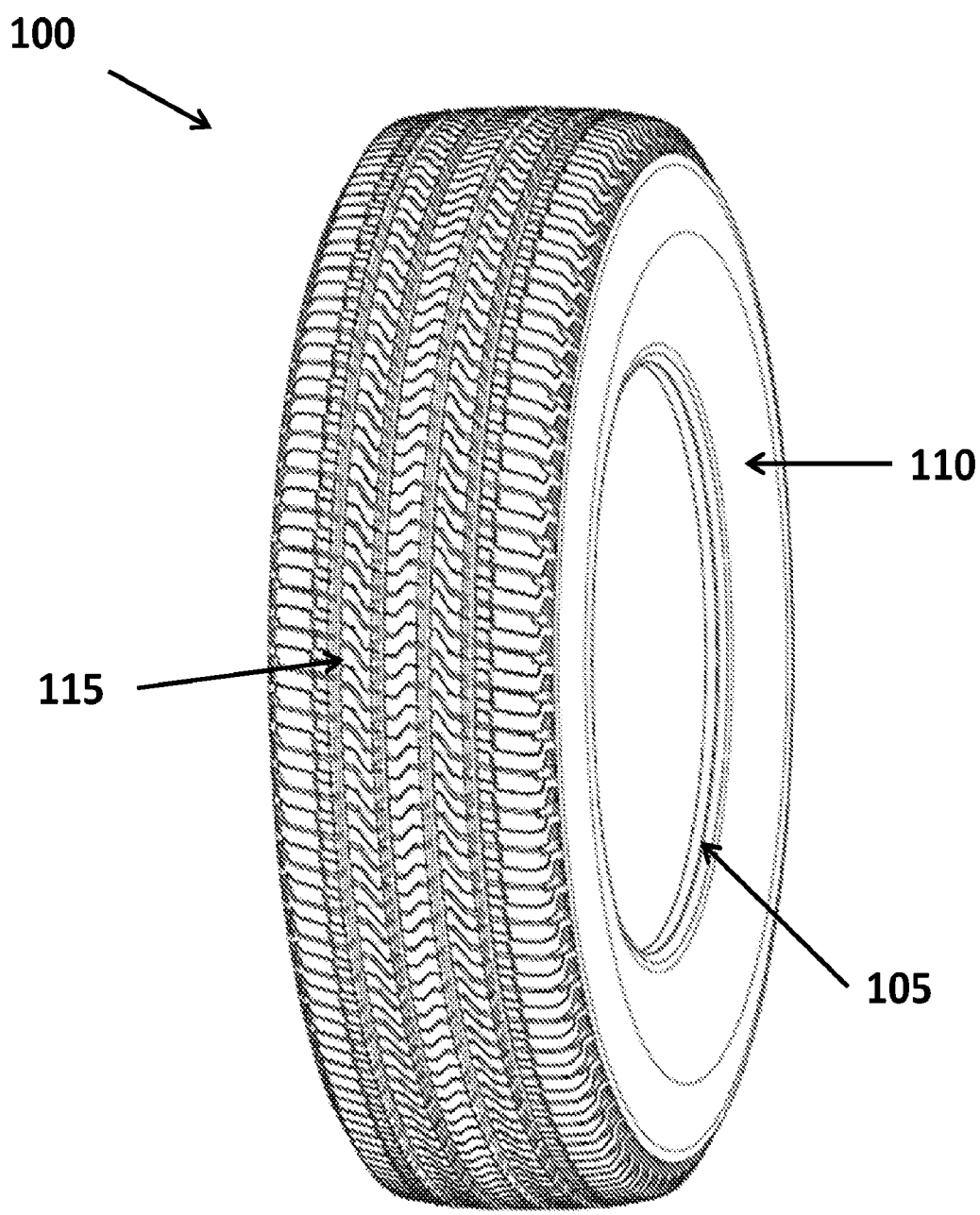
FIG. 1 is an isometric view of tire according to an embodiment of the present disclosure.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Lateral" and "laterally" refer to a direction along a tread of a tire going from one sidewall of the tire to the other sidewall.

"Radial" and "radially" refer to a direction perpendicular to the axis of rotation of a tire.

"Rib" or "ribs" define the circumferential extending strip or strips of rubber on the tread that is defined by at least one circumferential groove and either a second circumferential groove or a lateral edge of the tread.

"Sidewall" refers to that portion of the tire between the tread and the bead.

"Tread" as used herein, refers to that portion of the tire that comes into contact with the road or ground under normal inflation and normal load.

Directions are stated herein with reference to the axis of rotation of the tire. The terms "upward" and "upwardly" refer to a general direction towards the top surface of the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the top surface of the tread than the "lower" or "bottom" element. Additionally, when relative directional terms such as "above" or "below" are used in connection with an element, an element that is "above" another element is closer to the top surface of the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

FIG. 1 is an isometric view of a tire 100 according to an embodiment of the present disclosure. Tire 100 includes a pair of bead portions 105, sidewalls 110 connected to the bead portions 110, and a tread 115 attached to the sidewalls 110. Although not shown, the tire 100 further comprises a carcass ply attached to the bead portions 110, and supporting the sidewalls 110 and tread 115.

Figure 2:
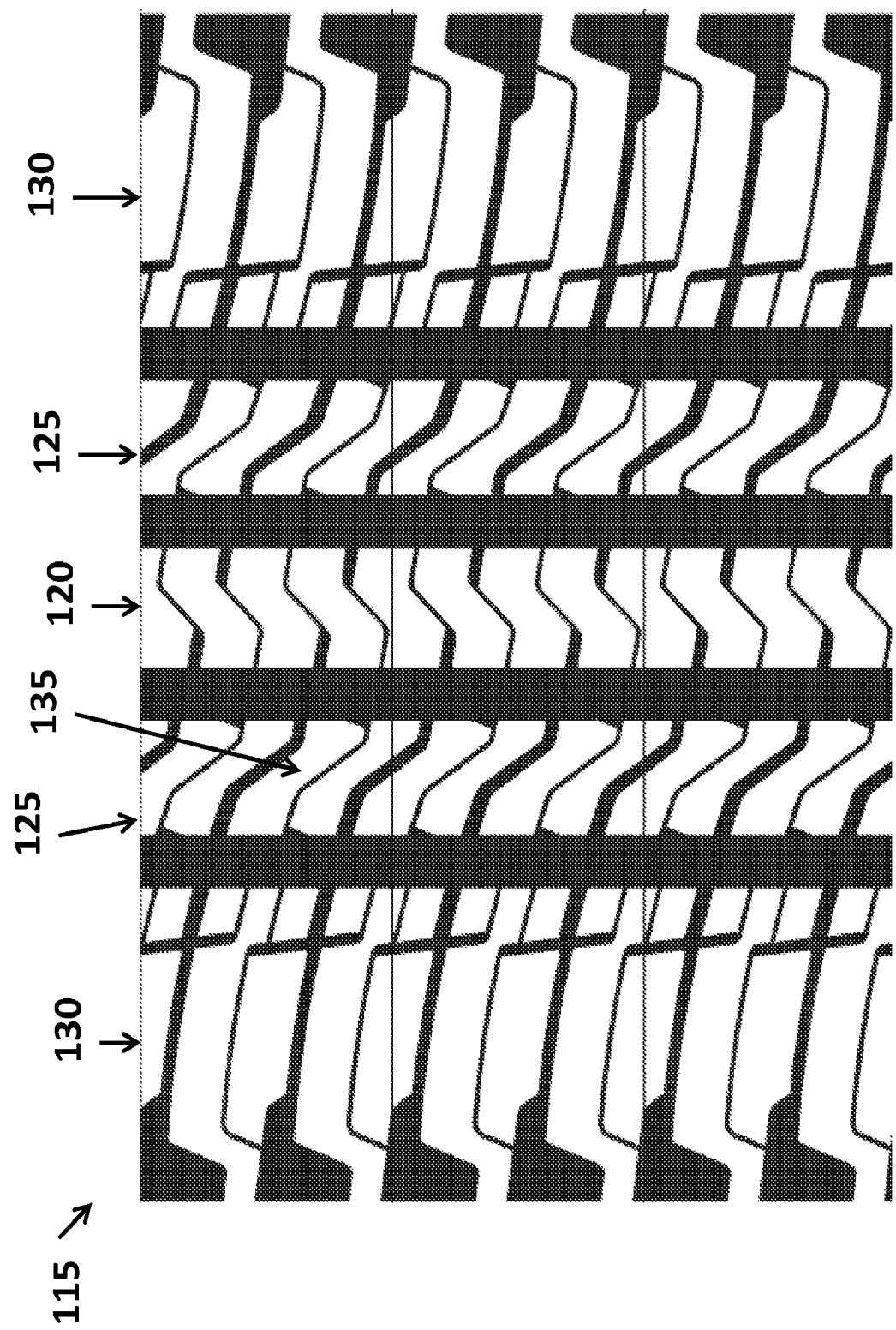
FIG. 2 is a top view of a tread of the tire according to the embodiment of FIG. 1.

FIG. 2 is a top view of the tread 115 having five ribs, including a central rib 120, two intermediate ribs 125, and two shoulder ribs 130. A plurality of blocks 135 form the two intermediate ribs 125 on the surface of the tread 115. While five ribs are shown in the illustrated embodiment, it should be understood that any number of ribs may be employed. The number of ribs and the design of ribs provide different performance characteristics to the tire 100, and can be altered to make changes to the tire weight, braking, acceleration, cornering, traction, durability, etc. In alternative embodiments (not shown), other types of tread elements can be used in place of blocks, such as lugs.

Figure 3:
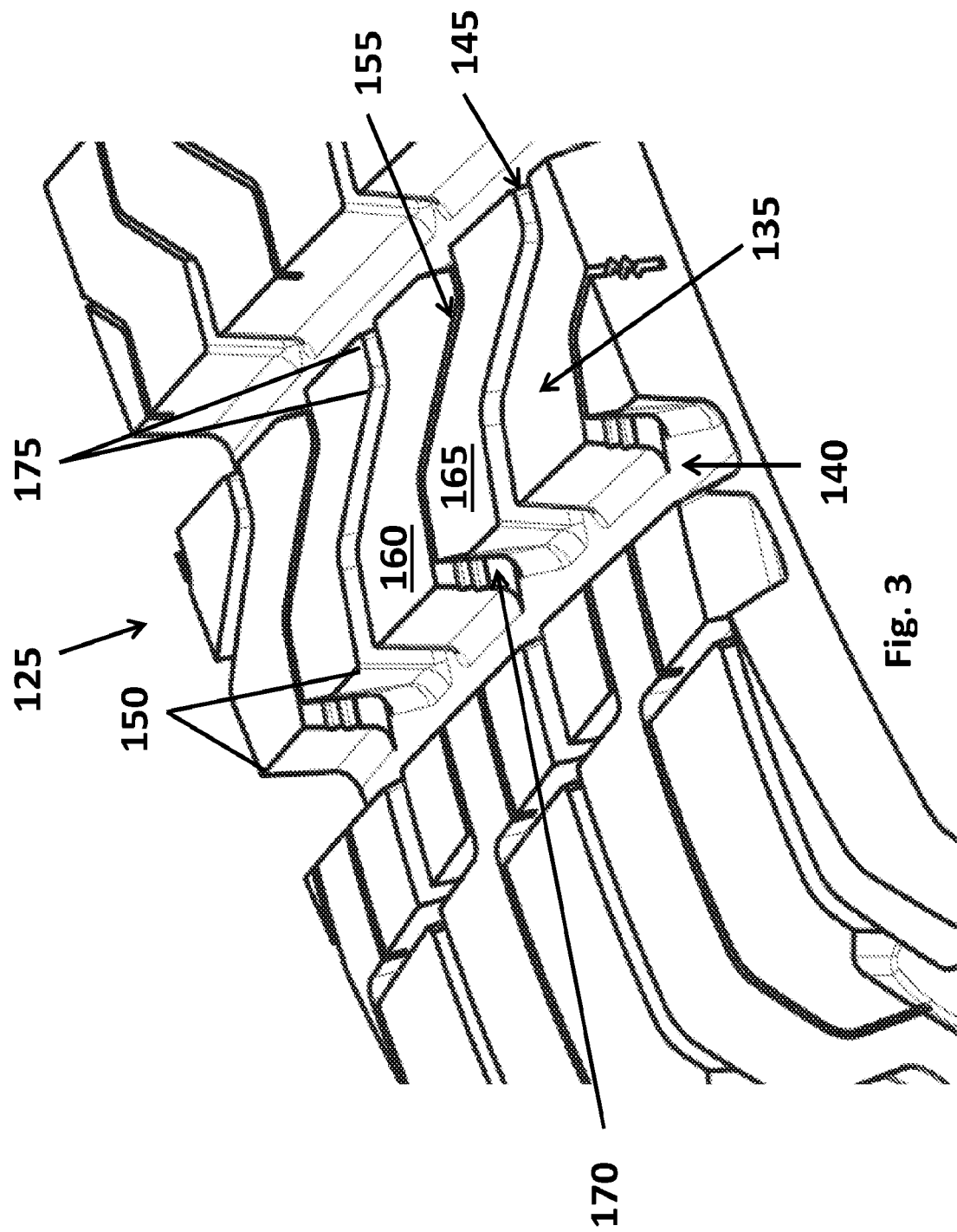
FIG. 3 is a perspective detailed view of a tread pattern according to the embodiment of FIG. 1.

FIG. 3 is a perspective detailed view of a portion of an intermediate rib 125 of the tread 115. The blocks 135 of intermediate rib 125 are defined by circumferential grooves 140 that extend about the tire 100. The blocks 135 are further defined by lateral grooves 145.

The circumferential grooves 140 define side walls of blocks 135. Lateral grooves 145 also define exterior walls of the blocks 135. Blocks 135 extend in a generally lateral direction from one circumferential groove 140 to another circumferential groove 140.

In the illustrated embodiment, the circumferential grooves 140 are substantially straight, and the lateral grooves 145 are three-part grooves formed of three linear segments. As a result, each block 135 is shaped as an irregular polygon, having a plurality of external corners 150 at a top surface thereof. However, it should be understood that the circumferential grooves and lateral grooves may take any shape. Likewise, the blocks 135 and block portions could take any geometric shape, instead of the ones depicted in FIG. 3, including but not limited to rectangular shapes, trapezoidal shapes, or other polygonal or non-linear shapes.

Each block 135 includes a sipe 155 that divides the block 135 into a first portion 160 and a second portion 165. Sipe 155 defines interior walls of first and second portions 160, 165. Interior and exterior walls of the first and second portions 160, 165 can also be referred to as first and second walls, the first wall of each first portion 160 being the wall defined by lateral groove 145, and the second wall of each first portion 160 being the wall defined by sipe 155. Likewise, the first wall of each second portion 165 can be defined as the wall defined by sipe 155, and the second wall of each second portion 165 can be defined as the wall defined by lateral groove 145. Using this nomenclature, the second wall of the first portion 160 faces the first wall of the second portion 165.

Sipe 155 extends from one circumferential groove 140 to another circumferential groove 140, and divides the entire block 135 in a lateral direction. In this embodiment, sipe 155 is not linear, and instead is segmented into three linear portions in a lateral direction. Sipe 155 extends radially through the block 135 to a base of the block 135. In alternative embodiments (not shown), sipe 155 may not extend from one circumferential groove 140 to another circumferential groove 140, and/or may extend less than all the way to the base of block 135. In other alternative embodiments (not shown), a plurality of sipes can be included in each block 135. In other alternative embodiments (not shown), sipe can take any form in a lateral direction, including non-linear forms. In other alternative embodiments (not shown), the sipe can divide the block 135 into two unequally sized portions.

FIG. 3 further shows cut-out portions 170 located on the first and second portions 160, 165 of block 135. Cut-out portions 170 may also be referred to as chamfered or beveled edges. These cut-out portions 170 expose interior walls of the first and second portions 160, 165. The cut-out portions 170 located on the first and second portions 160, 165 extend from the respective lateral walls to the respective interior walls of each portion. The cut-out portions 170 can form any angle with respect to a radial axis of the tire 100, but in this embodiment the cut-out portions are parallel to a radial axis. In alternative embodiments (not shown), the cut-out portions 170 can form other angles with respect to the radial axis, such as a 20 degree angle or a 30 degree angle, as described in more detail below. In alternative embodiments (not shown), cut-out portions can take any other form that exposes the sipe 155.

A majority of external corners 150 form obtuse angles when viewed from a top surface, to improve the strength and robustness of the blocks 135. In alternative embodiments (not shown), the external corners 150 could comprise a majority right angles, or acute angles depending on the requirements of the particular application. In other alternative embodiments (not shown), the external corners 150 could form equal numbers of obtuse, acute, or right angles.

The blocks 135 further include internal corners 175 that are defined by the sipe 155 and cutout portions 170. A majority of these internal corners 175 form obtuse angles on the first and second portions 160, 165 of blocks 135 when viewed from a top surface, to improve the strength and robustness of the blocks 135. In other alternative embodiments (not shown), the internal corners could form equal numbers of obtuse, acute, or right angles.

Figure 4:
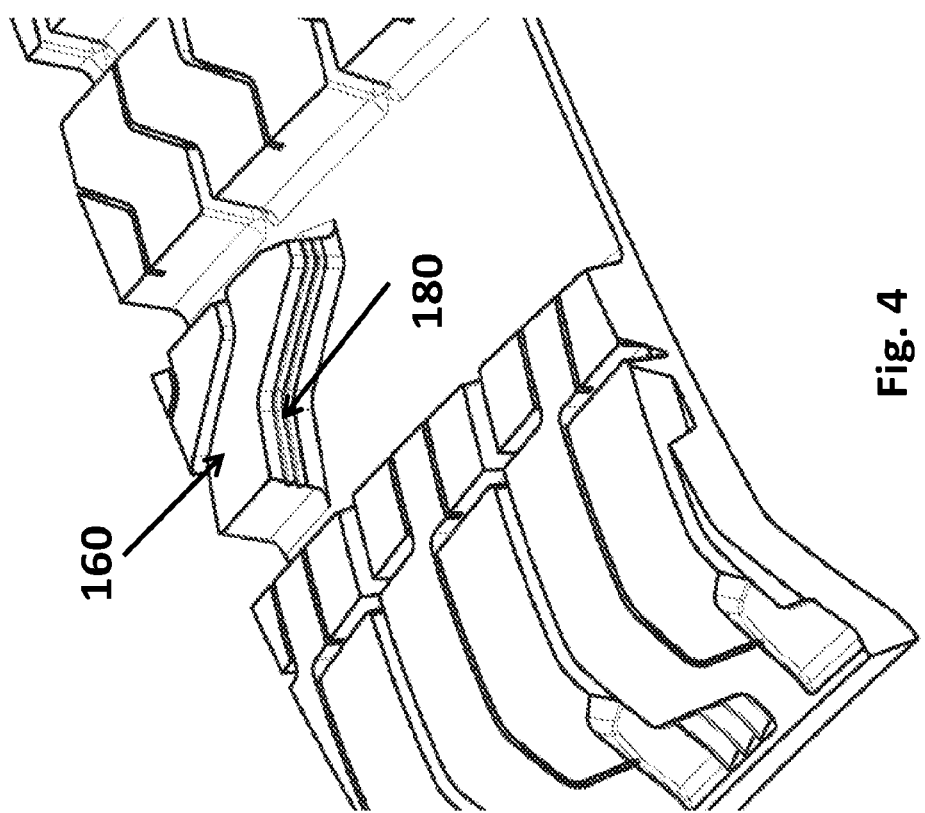
FIG. 4 is a cut-away perspective detailed view of a first portion of the block according to the embodiment of FIG. 1.

FIG. 4 depicts the details of the interior wall of first portion 160. Although not shown, the interior wall of second portion 165 will include corresponding details as described in this section. Sipe 155 defines a sipe pattern 180 that extends laterally across the interior wall of first portion 160. In this embodiment, the pattern 180 is a zig-zag pattern, wherein three protruding peaks extend in a circumferential direction from the interior wall of first portion 160. In alternative embodiments (not shown), the pattern 180 may include less or more than three protruding peaks extending in a circumferential direction from the interior wall of the first portion 160. In other alternative embodiments (not shown), the pattern can comprise a zig-zag patterns where each interior wall includes both protrusions and corresponding recessions. In other alternative embodiments (not shown), the pattern 180 can take any form other than a zig-zag pattern, including patterns with protruding and/or recessed features. In other alternative embodiments (not shown), pattern 180 can extend less than the entire lateral length of the interior wall of first portion 160.

Referring back to FIG. 3, a portion of the pattern 180 is exposed due to the cutout portion 170. The exposure provided by cutout portions 170 aids in marketing the features of patterns 180 on the first and second portions 160, 165. With patterns 180 exposed, a consumer may easily observe the pattern 180, which may aid in marketing the tire. The exposure also improves the efficiency of the patterns 180 in packing and holding snow when the tire 100 is driven over snowy terrain. Specifically, the exposed protrusions or recesses form pockets that may trap snow. Improved packing of the snow in turn improves performance characteristics of tire 100, including but not limited to improved traction.

Figure 5:
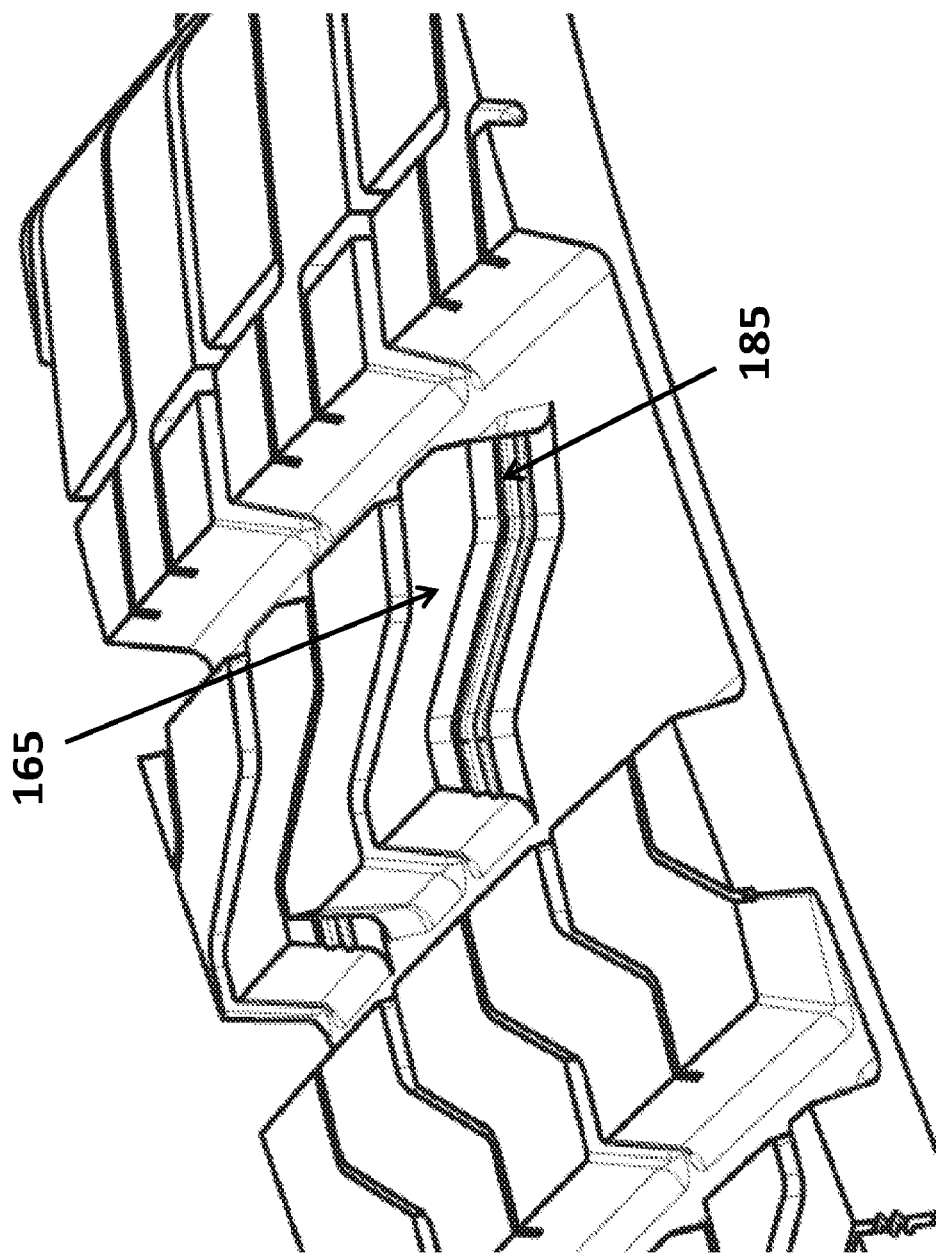
FIG. 5 is a perspective detailed view of a second cut-out portion of the tread pattern of FIG. 1.

FIG. 5 shows a perspective view of a pattern 185 on an interior wall of second portion 165. The pattern 185 is formed on the second portion 165 by sipe 155 in the same manner as the pattern 180 is formed on the first portion 160. Pattern 185 is offset from pattern 180, and includes only two protruding peaks, so that the protrusions of each pattern mesh with each other.

Figure 6A:
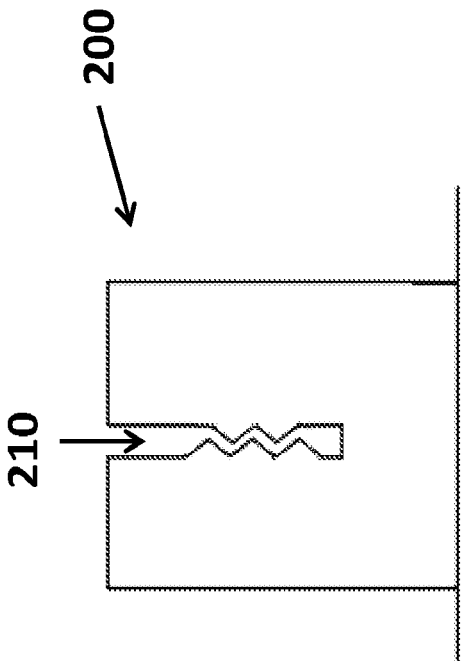
FIGS. 6A-6E are cross-section views of various embodiments of a sipe according to various blocks of the present disclosure.

FIGS. 6A-6E are schematic drawings showing cross section views of various embodiments of a portion of a block according to the present disclosure. FIG. 6A illustrates the block 135 with first portion 160, second portion 165, and sipe 155 defining interior walls of the first and second portions 160, 165. As seen in FIG. 6A, patterns 180, 185 take the form of interlocking zig-zag patterns protruding from the interior walls of the first and second portions 160, 165, respectively. In this embodiment, the sipe 155 extends all the way to the surface of tire tread 115, and defines patterns 180, 185. As seen from this perspective, patterns 180 and 185 mesh with each other. The geometry and location of sipe 155 can be modified to provide the tire 100 with different braking and/or accelerating properties, and can be designed to alter other performance characteristics of the tire 100 as well.

Figure 6B:
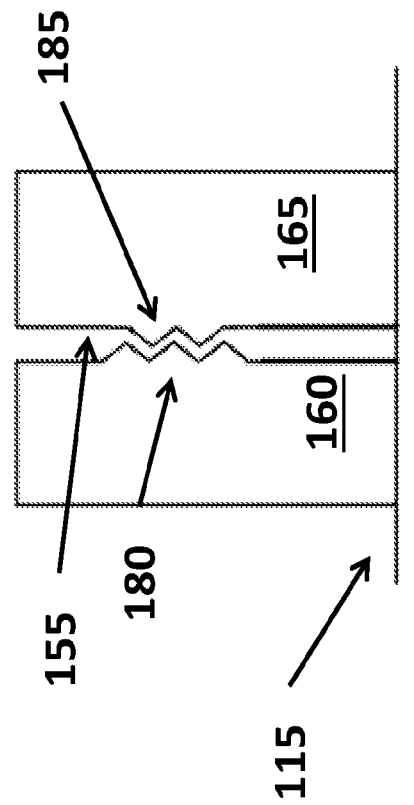
Figure 6C:
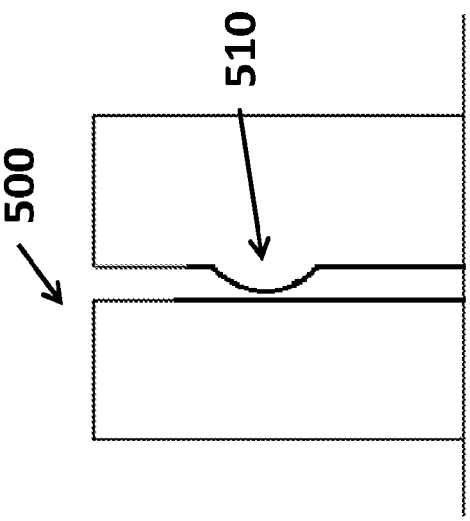
Figure 6D:
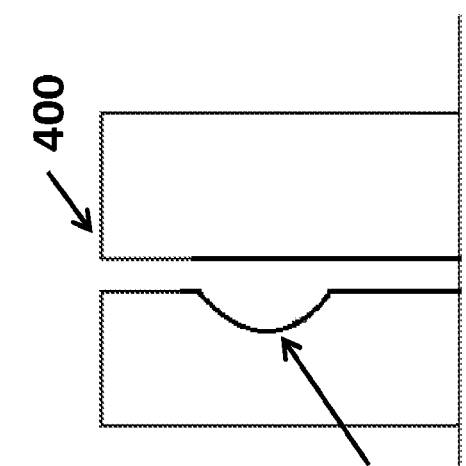
Figure 6E:
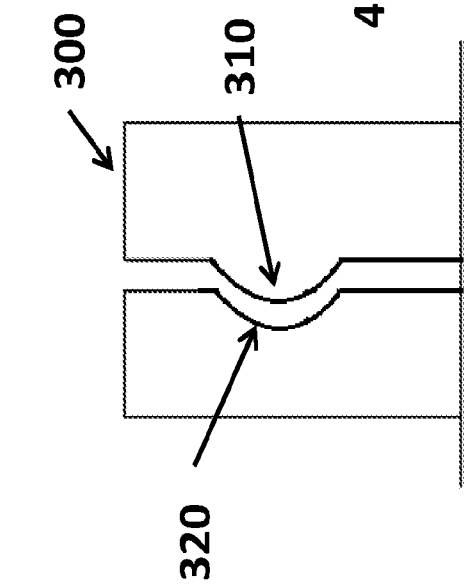

FIG. 6B shows an alternative embodiment of a block 200, similar to the one shown in FIG. 6A, which has a sipe 210 that does not extend all the way to the tread surface. FIG. 6C depicts another alternative embodiment of a block 300, similar to the one shown in FIG. 6A, but where the zig-zag patterns are replaced with a rounded protrusion 310 and a corresponding rounded recession 320. FIG. 6D depicts another alternative embodiment of a block 400, similar to the one shown in FIG. 6A, but where the zig-zag pattern is replaced with a crescent recession 410 on only one portion of the block 400. FIG. 6E depicts another alternative embodiment of a block 500, similar to the one shown in FIG. 6A, but where the zig-zag pattern is replaced with a crescent protrusion 510 protruding from only one portion of block 500. The patterns can take other forms not shown here, including any three dimensional shape. For example, the patterns can include a combination of two or more of the embodiments of FIGS. 6A-6E.

Figure 7:
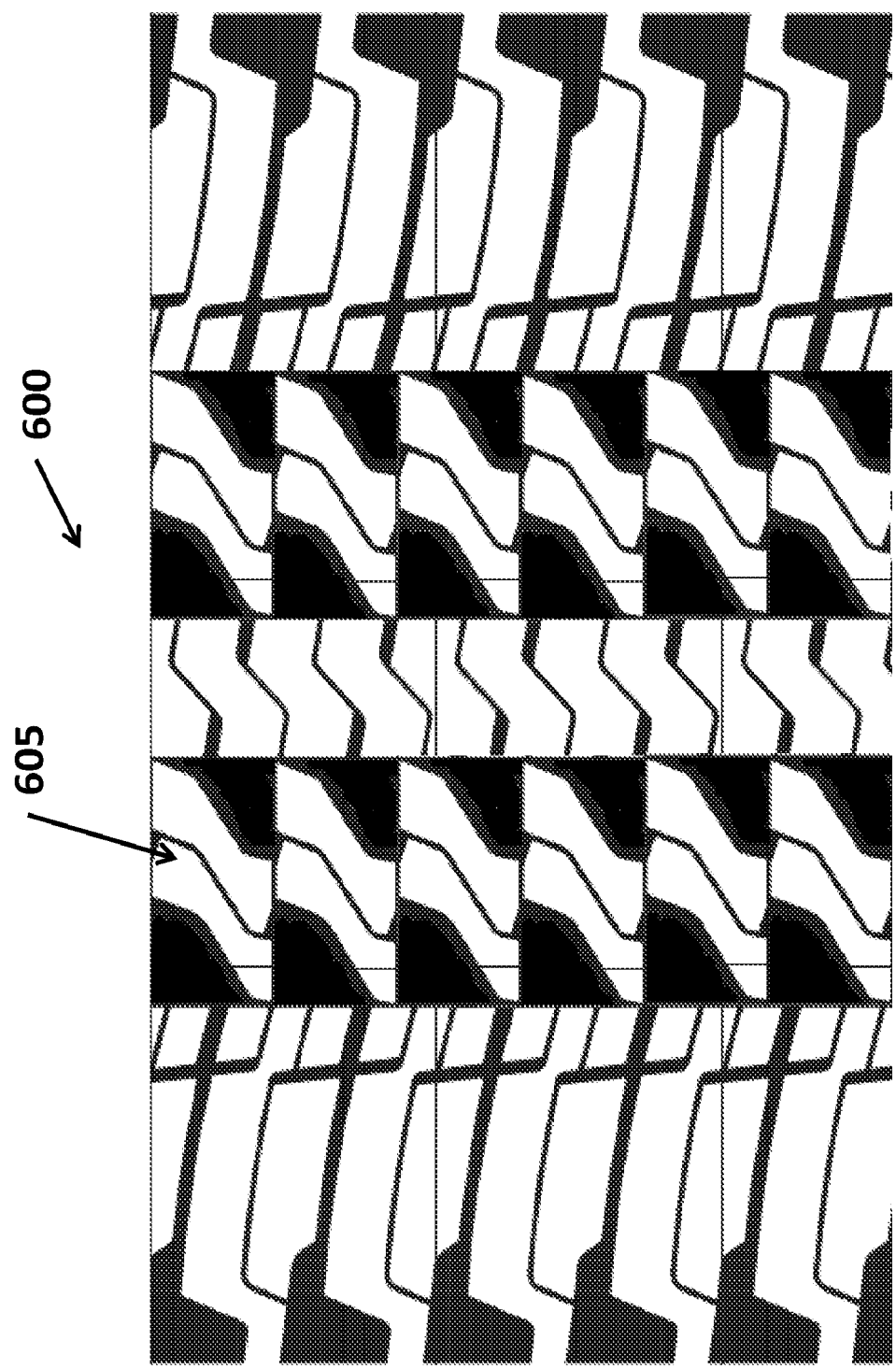
FIG. 7 is a top view of a tread pattern having the blocks rotated ninety degrees, according to another embodiment of the present disclosure.

In the first illustrated embodiment of FIGS. 1-5, the sipe 155 extends in a substantially lateral direction from one circumferential groove 125 to another circumferential groove 125. This orientation causes the interior walls of the blocks 135 to extend laterally across the surface of the tread 115, and the cut-out portions 170 expose the interior walls in leading and trailing directions, with respect to the tire in operation. In other embodiments, the sipe 155 can extend circumferentially from one lateral groove to another lateral groove. One example of such an alternative is depicted in FIG. 7, which shows another embodiment of a tread 600, having blocks 605 rotated ninety degrees from the orientation shown in FIG. 3. In other alternative embodiments (not shown), blocks can be oriented at any angle along the tread.

In another alternative embodiment, a tire tread includes cut-out portions that expose interior walls in leading and trailing directions in a similar manner to the cut-out portions 170 of the tread 115. However, each cut-out portion of the tread is defined by a chamfered wall that is disposed at an acute angle relative to a plane passing through the chamfered wall that is defined by the axial direction and a radial direction. In other words, while the chamfered walls of the cut-out portions 170 of the tread 115 extend downward in a radial direction, the chamfered walls of the cut-out portions of the tread extend downward in a non-radial direction. Chamfered walls that extend at an acute angle with respect to the radial direction may provide a more balanced stiffness of the tread lug.

In one embodiment, the chamfered wall extends at an angle between 20 and 30 degrees with respect to the radial direction. In another embodiment, the chamfered wall extends at an angle between 30 and 60 degrees with respect to the radial direction. In yet another embodiment, the chamfered wall extends at an angle greater than 60 degrees with respect to the radial direction. In still another embodiment, the chamfered wall extends at an angle less than 20 degrees with respect to the radial direction.

The cut-out portion of the tread exposes a sipe pattern. While the sipe pattern is similar to the sipe pattern shown in FIGS. 1-5, it should be understood that any sipe pattern may be exposed. For example, any of the sipe patterns shown in FIGS. 6A-6E may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire including a partially exposed block, comprising:
   a tread extending in a circumferential direction around an outer surface of the tire;
   a plurality of blocks protruding outwardly from the tread, wherein each block includes a sipe that divides the block into a first portion and a second portion, wherein the sipe further defines a first interior wall of the first portion and a second interior wall of the second portion of each block, wherein each first portion has a first pair of lateral ends defined by a first pair of lateral walls, wherein each second portion has a second pair of lateral ends defined by a second pair of lateral walls, wherein the first interior wall of each first portion has a pattern extending in a radial direction, wherein each second portion has a chamfered edge extending perpendicularly to a top surface of the block, between the second interior wall and one of the second pair of lateral walls, and wherein each chamfered edge extends at an angle diverging from the first interior wall, thereby exposing the pattern of a corresponding first portion.

2. The tire of claim 1, wherein each pattern contains a protrusion, extending from the first interior wall of each first portion.

3. The tire of claim 1, wherein the pattern on the first interior wall of each first portion contains a protrusion and a recess.

4. The tire of claim 1, wherein each second interior wall of each second portion has a pattern corresponding to the pattern of each first portion.

5. The tire of claim 1, wherein each pattern extends entirely across its corresponding first portion.

6. A tire including a partially exposed block, comprising:
a carcass ply;
a bead portion,
wherein the carcass ply terminates in the bead portion;
a tread extending circumferentially around an outer surface of the tire, on top of the carcass ply,
wherein the tread includes a rib extending circumferentially around an outer surface of the tire;
wherein the rib is formed by a plurality of blocks, each block having a pair of lateral ends defined by a pair of lateral walls,
wherein the tread includes lateral grooves,
wherein each block includes a sipe that defines a first portion and a second portion of the block,
wherein the sipe defines interior walls of the first and second portion of each block,
wherein the interior wall of each first portion has a first zig-zag pattern extending in a radial direction,
wherein the interior wall of each second portion has a second zig-zag pattern extending in a radial direction, and which corresponds with the first zig-zag pattern, and
wherein each second portion has a chamfered edge extending perpendicularly to a top surface of the block, between one of the interior walls and one of the lateral walls, and wherein each chamfered edge extends at an angle diverging from an opposite interior wall, thereby exposing a corresponding first zig-zag pattern.

7. The tire of claim 6, wherein a top surface of each first and second portion defines a shape having a plurality of corners, the plurality of corners having a plurality of angles, wherein over half of the plurality of angles of each shape are obtuse angles.

8. The tire of claim 6, wherein each first portion includes a second chamfered edge extending perpendicularly to a top surface of the block, between another one of the interior walls and another one of the lateral walls, the second chamfered edge exposing a corresponding second zig-zag pattern.

9. The tire of claim 6, wherein each block has a plurality of sipes.

10. The tire of claim 6, wherein the rib is a first rib, and the tire further includes a second rib that is a mirror image of the first rib.

11. The tire of claim 6, wherein the rib is a first rib, and the tire further includes a second rib parallel to the first rib.

12. The tire of claim 6, wherein each sipe extends from a first circumferential groove to a second circumferential groove.

13. The tire of claim 6, wherein each zig-zag pattern extends entirely across its corresponding block.

14. A tire tread including a partially exposed block, comprising:
a plurality of blocks;
a plurality of circumferential grooves on the tire tread, defined by the plurality of blocks;
a plurality of lateral grooves extending between the plurality of circumferential grooves,
wherein each block has a first and a second portion,
wherein the first portion has a first interior wall and the second portion has a second interior wall,
wherein each first portion has a first pair of lateral ends defined by a first pair of lateral walls,
wherein each second portion has a second pair of lateral ends defined by a second pair of lateral walls,
wherein the first interior wall of each first portion includes a first pattern and the second interior wall of each second portion includes a second pattern corresponding to the first pattern, and
wherein each second portion includes a chamfered edge extending perpendicularly to a top surface of the block, between the second interior wall and one of the second pair of lateral walls, and
wherein each chamfered edge extends at an angle diverging from the first interior wall, thereby exposing the first pattern on a corresponding first portion.

15. The tire of claim 14, wherein the first and second patterns mesh with each other.

16. The tire of claim 14, wherein each pattern extends entirely across its corresponding portion.

* * * * *